United States Patent [19]

Ito et al.

[11] 4,237,192
[45] Dec. 2, 1980

[54] ZINC PLATED STEEL PLATE AND CAN PRODUCED FROM THE SAME

[75] Inventors: Takehiko Ito; Yusuke Hirose; Hideaki Ishida, all of Ichikawa, Japan

[73] Assignee: Nisshin Steel Co., Ltd., Tokyo, Japan

[21] Appl. No.: 7,827

[22] Filed: Jan. 30, 1979

[51] Int. Cl.³ .............................................. B32B 15/08
[52] U.S. Cl. .................................... 428/659; 428/626; 427/250; 427/406; 427/552; 427/433; 204/38 E
[58] Field of Search ............... 427/406, 309, 250, 251; 220/454, 457, 458, 456; 204/43 Z, 38 E; 428/626, 659

[56] References Cited

U.S. PATENT DOCUMENTS

| | | | |
|---|---|---|---|
| 1,268,987 | 6/1918 | McMullen | 428/659 |
| 2,142,024 | 12/1938 | Hall | 427/406 |
| 2,175,972 | 10/1939 | Rainer | 220/456 |
| 2,407,881 | 9/1946 | Hoover et al. | 427/406 |
| 2,412,528 | 12/1946 | Morrell | 220/458 |
| 3,108,709 | 10/1963 | Bosmajian | 220/456 |
| 3,674,445 | 7/1972 | Wlodek | 427/406 |

FOREIGN PATENT DOCUMENTS

| | | | |
|---|---|---|---|
| 481742 | 3/1976 | Australia | 427/406 |
| 2009716 | 2/1970 | France | 427/406 |
| 49-11735 | 2/1974 | Japan | 204/38 E |

OTHER PUBLICATIONS

Belford, Industrial Finishing, Aug. 1966, pp. 61, 62, 64, 66, 67.

Primary Examiner—Ralph S. Kendall
Attorney, Agent, or Firm—Wenderoth, Lind & Ponack

[57] ABSTRACT

This invention relates to a zinc plated steel plate, at least one side surface of which is substantially free from oxides and coated with an anti-rust film, and a can produced from said zinc plated steel plate having an interlocking seam joint bonded by soldering techniques.

4 Claims, 4 Drawing Figures

ZINC PLATED STEEL PLATE AND CAN PRODUCED FROM THE SAME

BACKGROUND OF THE INVENTION

This invention relates to a zinc plated steel plate having an improved solderability, and this invention also relates to various cans such as 18 liter-cans, paint cans, oil cans and the like which are produced from said zinc plated steel plate using ordinary soldering techniques. The zinc plated steel plate of this invention having an improved solderability is a zinc electroplated steel plate, zinc vapour deposited steel plate or molten zinc-plated (galvanized) steel plate plated by the use of a molten zinc plating bath containing easily oxidizable elements such as aluminum, the solderability of which is improved by making the surface substantially free from oxides and coating an anti-rust film on the oxide-free surface to keep the surface free from oxides.

Heretofore, a tin-plated steel plate (hereinafter referred to as "tin-plate") has been used as a starting material to produce various cans by the use of solder. However, recently, tin resources have been exhausted worldwide and the price of tin plate has suddenly risen. Accordingly, the development of other starting materials having satisfactory solderability and anti-corrosive properties on the same or a higher level in comparison with tin plate is in high demand. In order to satisfy this demand, a steel plate having a thin metallic chromium layer and chromic acid film, i.e. a tin free steel plate, has been developed and used as a starting material to produce cans.

This tin free steel plate has the same or better anti-corrosive properties and paintability for baking paint and its price is lower in comparison with tin plate.

However, the solderability of this plate is much poorer than that of tin plate. This is a great disadvantage of this plate. Therefore, when manufacturing cans using the tin free steel plate, it is necessary to employ a seam welding technique or other special bonding techniques using a bonding agent such as seam cement on its bonding counter part.

On the other hand, in order to produce cans on a mass production scale, an operating efficiency and production efficiency equivalent to those in the present tin plate can producing process are required, and complete soldering must be carried out by the can producing equipment using the present automatic soldering system. The above mentioned seam welding technique or other special bonding techniques emploued to produce cans from the tin free steel plate is poorer with respect to working efficiency, and production efficiency and cost than the conventional soldering technique, and also creates various problems with respect to production equipment. Under these circumstances, the development of new and cheap can materials is desired, which do not give rise to the above mentioned various problems as in the case of the bonding of tin free steel plate, and which can be substituted for the conventional tin plate.

If the new material as mentioned above can be developed, the material will be widely used not only as a starting material for cans but also for various other uses where appropriate solderability is required, for example chassis of light electrical appliances such as radios, televisions and the like.

For the purpose of research for new material which does not have the above mentioned disadvantages and which can be favourably used as a starting material to produce various cans such as 18 liter cans, we have tested many various surface treated steel plates with respect to properties for can material. As a result of this research, we have found that a zinc electroplated steel plate, zinc vapor deposited steel plate, or galvanized steel plate plated by the use of a molten zinc plating (galvanizing) bath containing easily oxidizable elements such as aluminum, having solderability improved by making the surface substantially free from oxides and coating an anti-rust film on the oxide-free surface, is an excellent can material. The zinc plated steel plate thus treated has solderability equivalent to that of tin plate, and is better in respect of corrosion resistance and price than tin plate.

SUMMARY OF THE INVENTION

An object of this invention is to provide a zinc plated steel plate, the solderability of which is improved by coating an anti-rust film on at least one surface substantially free from oxides.

A further object of this invention is to provide can produced from said zinc plated steel plate joined by an interlocking seam joint which is bonded with solder.

tan $\alpha$: Initial Spreading Rate (mm$^2$/sec)

Se: Equilibrium Spread Area (mm$^2$)

Figure 1A:
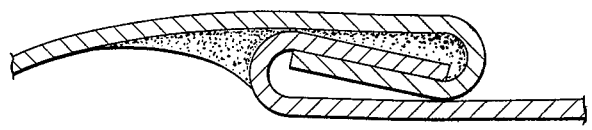
FIG. 1 is a cross-sectional view showing the state of penetration of solder into the respective interlocking seam joints of: (1a) zinc plated steel plate of this invention having an improved solderability, (1b) comparative ordinary galvanized steel plate, and (1c) ordinary tin plate prepared in accordance with the procedures in Example 6.

FIG. 4 shows curves illustrating the relation between the secondary ion intensity ratio ($I_{Al^+}/I_{Zn^+}$) and solder initial spreading speed (mm$^2$/sec) or the solder equilibrium spread area after 30 seconds (mm$^2$).

DESCRIPTION OF THE PREFERRED EMBODIMENT

The zinc plated steel plate of this invention and cans produced from the same are more fully described hereinafter.

The term, "zinc plated steel plate substantially free from oxides on its surface" used herein means plate having a surface (up to a depth of 200 Angstroms) wherein the ratio of aluminium ion detection intensity ($I_{Al^+}$)/zinc ion detection intensity ($I_{Zn^+}$) is not higher than 20 at the maximum ($I_{Al^+}/I_{Zn^+}$ = not higher than 20). These values of aluminium ion detection intensity and zinc ion detection intensity are the values determined by an Ion Microanalyzer (Hitach IMA-2 Type) under the following conditions:

| | |
|---|---|
| Primary Ion | Ar+ |
| Accelerated Voltage | 15 KV |
| Sample Electric Current | 0.3 μA |
| Primary Ion Beam Diameter | 500 μm |

We have discovered that the "zinc plated steel plate substantially free from oxides on its surface", i.e. the zinc plated steel plate having a surface wherein the ion intensity ratio ($I_{Al^+}/I_{Zn^+}$) is not higher than 20, has an excellent solderability. That is, as shown by FIG. 4, the zinc plated steel plate having a surface with an ion intensity ratio of not higher than 20 has a solder initial spreading speed ($mm^2$/sec) of not less than 9 and a solder equilibrium spread area after 30 seconds ($mm^2$) of not less than 60, which are the essential conditions for commercially acceptable solderability.

If a steel plate is plated in a zinc-aluminum bath containing 0.1–0.3% by weight of aluminum generally used in a continuous molten zinc plate (galvanizing) lines, oxides, mainly aluminum oxide, other than zinc oxide, are formed on the surface layer. In addition to aluminum oxide, oxides of easily oxidizable elements such as titanium, chromium, silicon, iron and the like may possibly be formed either alone or in a composite form as spinel type oxide; but the amount of the oxides other than aluminum oxide is very small and its influence on solderability is negligible. These elements are introduced into the bath from starting materials, equipment and the like. If these stable oxides comprising aluminum oxide as the main component are present on the surface, they interrupt activation by flux during soldering, and consequently the solderability of ordinary galvanized steel plate is poor. As disclosed in Japanese Patent Laid Open (Kokai) No. 51-95941, if these oxides on the surface are removed by etching, the solderability is notably improved. However, if these oxides are not present on the surface, the surface of the plate is active and not corrosion-resistant. Therefore, zinc white rusts of carbonates, hydroxides and the like are easily formed on the surface simply by placing the plate outdoors, and the plate becomes useless.

The zinc-plated steel plate of this invention does not have the above mentioned disadvantages. The zinc-plated steel plate is prepared by electro-plating, vapour depositing or galvanizing in a molten zinc plating bath including easily oxidizable elements such as aluminium and the like in a well known manner. According to this invention, the solderability and anti-corrosion properties of the zinc plated steel plate are improved by making the plate substantially free from oxides and coating an anti-rust film on the oxide-free surface to keep the surface substantially free from oxides. In the case of a zinc electroplated or zinc vapour deposited steel plate, an etching process is not necessary before coating an anti-rust film since the plate is substantially free from oxides as it is, but in the case of a galvanized steel plate, an etching process is required to remove oxides derived from the plating bath.

The zinc-plated steel plate having the surface substantially free from oxides and coated with predetermined anti-rust film has solderability equivalent to or higher than that of tin plate, and therefore it can be fabricated into cans using the conventional tin plate can producing line in the same or higher working efficiency and production efficiency as in the production of the conventional tin plate cans. In addition to this advantage, the zinc-plated steel plate cans of this invention have higher corrosion-resistance and durability than the conventional tin plate cans.

Substantially most of the oxides on the surface of the zinc-plated steel plate can be removed by dipping the plate in an etching agent such as HCl, NaOH or other commercially available etching agents for a short time or by spraying the etching agent onto the plate. The plate thus treated or the plate having substantially no oxides on its surface and coated with an anti-rust film has excellent solderability.

The present invention is directed to a zinc-plated steel plate, at least one side of which is substantially free from oxides and coated with an anti-rust film composed of acryl type resin, alkyd type resin or petroleum type wax as described in the following examples, and the cans of this invention are fabricated from this plate by means of an interlocking seam joint bonded with soldering techniques.

Examples of the zinc-plated steel plate used in the present invention include galvanized steel plate, zinc electro-plated steel plate and zinc vapour-deposited steel plate.

The anti-rust film used in the present invention is preferably an organic anti-rust film. Examples of the organic anti-rust film are as follows:

(1) Acryl Type Resin, e.g. "CeBo HW-20" (trade name) manufactured by Toyo Pharmachemical Co., Ltd.

| Composition (% by weight): | |
|---|---|
| polyacrylic ester | 20% |
| isopropyl alcohol | a minor amount |
| non-ionic water | the rest |

(2) Acryl Type Resin, e.g. "Pipe Coat No. 692" (trade name) manufactured by Kansai Paint Co., Ltd.

| Composition (% by weight): | |
|---|---|
| alkyd resin varnish | 44% |
| petroleum type resin varnish | 9% |
| drying agent | 1% |
| thinner | 46% |

(3) Petroleum Type Wax, e.g. "Non Ruster PSW-51" (trade name) manufactured by Yushiro Chemical Industry Co., Ltd.

| Composition (% by weight): | |
|---|---|
| high melting petroleum type wax | 15–17% |
| low melting petroleum type wax | 8–10% |
| hard synthetic wax | 10–12% |
| higher aliphatic acid amine soap | 3–4% |
| antiseptic agent | a minor amount |
| water | 60–65% |

The present invention is further illustrated by the following Examples.

EXAMPLE 1

Ordinary minimized spangle or extra smooth galvanized steel plate having a plate thickness of 0.32 mm and a zinc amount on one side of about 60 g/$m^2$ plated continuously in a molten zinc plating bath containing a minor amount of aluminum and subjected to akin pass rolling was spray-treated with a 15% by weight solution of commercially available alkali type etching agent (trade name, "NP Cleaner No. 105 F" manufactured by Nippon Paint Co., Ltd., Composition: NaOH=40%, surface active agent=a minor amount, and non-ionic water=the rest) at 80° C. under a pressure of 0.5 kg/cm² to remove substantially most of the oxides on the surface ($I_{Al^+}/I_{Zn^+}=3$), and was then coated with a 15% by weight aqueous solution of acryl type resin (trade name, "CeBo HW-20" manufactured by Toyo Pharmachemical Co., Ltd.) as an anti-rust film by means of a roll coater. The plate thus treated was dried at 100°–150° C. for about 1 minute. The dry plate was then investigated with regard to the relation of the thickness of the anti-rust film to solderability and anti-corrosion properties. The results are shown in Table 1.

cans and the like and chassises for light electrical apparatuses such as radios, televisions and the like must satisfy the following conditions.

Solder Spreadability
  Initial Spreading Speed=not less than 9 mm²/sec.
  Equilibrium Spread Area=not less than 60 mm²
Anti-corrosion Properties
  (2-i) Wetting test: The amount of white rust occurring on the surface after 50 hours must be not more than 30%.
  (2-ii) Salt water spraying test: The amount of white rust occurring on the surface after 10 hours must be not more than 80%.

As can be seen from Table 1, if the thickness of the anti-rust film is less than 0.3 μm, the anti-corrosion properties become poor and do not satisfy the above conditions. On the other hand, if the thickness of the

TABLE 1

Relation of Thickness of Acryl Type Resin Anti-rust Film to Solderability and Anti-corrosion Properties of Galvanized Steel Plate

| Thickness of Anti-rust Film (μm) | Solder Spreadability[1] | | Anti-corrosion Properties | |
|---|---|---|---|---|
| | Initial Spreading Speed (mm²/sec) | Equilibrium Spread Area (mm²) | Wetting Test[2-i] Results | Salt Water[2-ii] Spraying Test Results |
| 0 | 18 | 140 | 70% White Rust | 80% White Rust |
| 0.1 | 18 | 140 | 40–60% White Rust | 80% White Rust |
| 0.3 | 18 | 140 | 15–30% White Rust | 70–80% White Rust |
| 0.4 | 18 | 140 | 10–25% White Rust | 70–80% White Rust |
| 1.1 | 18 | 138 | 5–10% White Rust | 60–70% White Rust |
| 3.4 | 17 | 136 | 3–6% White Rust | 45–55% White Rust |
| 5.9 | 17 | 134 | 1–5% White Rust | 40–50% White Rust |
| 12.1 | 16 | 133 | Normal | 15–30% White Rust |
| 15.8 | 16 | 130 | Normal | 10–20% White Rust |
| 20.6 | 15 | 122 | Normal | 5–15% White Rust |

The tests were carried out in the following manner.

(1) Solder Spreadability

Figure 3:
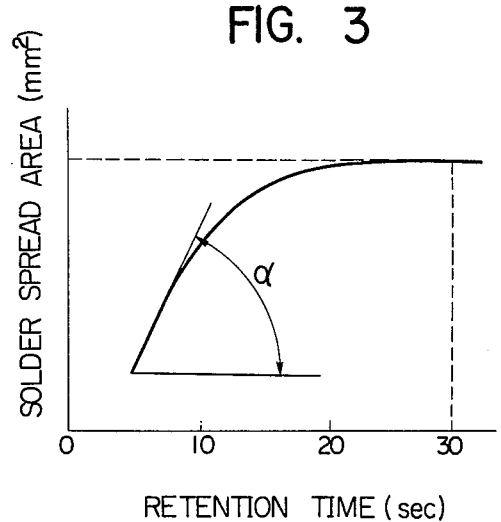
FIG. 3 shows a curve illustrating the relation between retention time (sec) and solder spread area (mm$^2$) with regard to the zinc-plated steel plate of this invention.

A test sample of 50 mm×50 mm was placed on a solder bath maintained at 280° C., and 0.2665 g of wire solder (resin type flux cored wire solder having a diameter 2 mm, Pb/Sn=50/50) in the form of a ring was placed on the test sample. Thereafter, the spreading movement of the solder upon heating was measured. The solder spreadability of the test material was evaluated by determining the tan α (initial spreading speed, mm²/sec) and Se (equilibrium spread area, mm²) after 30 sec. according to the solder spread curve as shown in FIG. 3.

(2) Anti-corrosion Properties
(2-i) Wetting Test

Anti-corrosion properties were evaluated by observing the state of rust on the surface of the test sample after placing the test sample under dew-point conditions at a relative humidity of 98% at 50° C. for 50 hours.

(2-ii) Salt Water Spraying Test

This test was carried out according to the JIS Z 2371 Salt Water Spraying Test, and the anti-corrosion properties were evaluated by observing the state of rust on the surface of the test sample after 10 hours.

It was experimentally found that anti-corrosive zinc plated steel plate which can satisfactorily be produced into various cans such as 18 liter cans, paint cans, oil anti-rust film exceeds 20 μm, it becomes difficult to uniformly coat to obtain an anti-rust film having a uniform thickness and this is not preferable from the economical view point although the solder spreadability and anti-corrosion properties satisfy the above conditions.

Therefore, it was found that the thickness of acryl type resin anti-rust film should preferably be 0.3–20 μm in view of solder spreadability, anti-corrosion properties, uniform coatability and economy.

EXAMPLE 2

A commercially available 15% by weight aqueous solution of acryl type resin (trade name, "CeBo HW-20" manufactured by Toyo Pharmachemical Co., Ltd.) was coated as an anti-rust film with a roll coater onto commercially available zinc electroplated steel plate defined as JIS G 3313 ($I_{Al^+}/I_{Zn^+}$=less than 0.1, the thickness of plate=0.6 mm, one side zinc adhering amount=20 g/m², not subjected to skin pass rolling and chemical conversion coating). The plate thus coated was heated at 100°–150° C. for about 1 minute to dry.

The relation of the thickness of the dry anti-rust film to the solderability and anti-corrosion properties of the zinc electroplated steel plate was investigated. The results are shown in Table 2.

TABLE 2

Relation of Thickness of Acryl Type Resin Anti-rust Film to Solderability and Anti-corrosion Properties of Zinc Electroplated Steel Plate

| Thickness of Anti-rust Film ($\mu$m) | Solder Spreadability | | Anti-corrosion Properties | |
|---|---|---|---|---|
| | Initial Spreading Speed (mm$^2$/sec) | Equilibrium Spread Area (mm$^2$) | Wetting Test Results | Salt Water Spraying Test Results |
| 0 | 20 | 170 | 100% White Rust | 1–3% Red Rust |
| 0.2 | 20 | 170 | 80–100% White Rust | Small Dotty Red Rust |
| 0.5 | 20 | 170 | 20–35% White Rust | 80–100% White Rust |
| 1.0 | 19 | 166 | 10–25% White Rust | 65–80% White Rust |
| 3.7 | 19 | 160 | 4–10% White Rust | 55–70% White Rust |
| 6.2 | 18 | 152 | 1–6% White Rust | 50–60% White Rust |
| 11.6 | 18 | 149 | 1–2% White Rust | 25–40% White Rust |
| 17.3 | 16 | 137 | Normal | 20–30% White Rust |
| 22.1 | 16 | 128 | Normal | 10–25% White Rust |

The above tests were carried out in the same manner as in Example 1. In view of the conditions of suitable solderability and anti-corrosion properties as described in Example 1, it was found that the thickness of acryl type resin anti-rust film on zinc electroplated steel plate should be at least 1.0 $\mu$m. On the other hand, if the thickness exceeds 20 $\mu$m, the plate becomes impractical for the same reasons as described in Example 1.

EXAMPLE 3

A commercially available 15% by weight aqueous solution of acryl type resin (trade name, "CeBo HW-20" manufactured by Toyo Pharmachemical Co., Ltd.) was coated an an anti-rust film with a roll coater onto commercially available zinc vapour deposited steel plate ($I_{Al}+/I_{Zn}+$ = less than 0.1, the thickness of the plate = 0.6 mm, one side zinc adhering amount = 25 g/m$^2$, not subjected to skin pass rolling and chemical conversion coating). The plate thus coated was dried at 100°–150° C. for about 1 minute.

The relation of the thickness of the anti-rust film after drying to the solderability and anti-corrosion properties of the zinc vapour deposited steel plate was investigated in the same manner as in Example 2. The results are shown in Table 3.

The testing methods were the same as in Examples 1 and 2.

In view of the conditions for suitable solderability and anti-corrosion properties as described in Example 1, it was found that the thickness of acryl type resin anti-rust film on zinc vapour deposited steel plate should be at least 1.0 $\mu$m in the same manner as in Example 2. On the other hand, if the thickness exceeds 20 $\mu$m, the plate becomes impractical for the same reasons as described in Example 1.

Consequently, judging from the results of Examples 1, 2 and 3, it was found that the thickness of acryl type resin anti-rust film should preferably be 1.0–20 $\mu$m in view of solder spreadability, anti-corrosion properties, uniform coatability and economy.

EXAMPLE 4

Alkyd type resin (trade name, "Pipe Coat No. 692" manufactured by Kansai Paint Co., Ltd.) was coated as an anti-rust film with a roll coater onto the surface of galvanized steel plate from which substantially most of the oxides have been removed ($I_{Al}+/I_{Zn}+ = 4$). The plate thus coated was heat-dried.

The relation of the thickness of the anti-rust film after drying to the solderability and anti-corrosion properties of molten zinc plated steel plate was investigated. The results are shown in Table 4.

TABLE 3

Relation of Thickness of Acryl Type Resin Anti-rust Film to Solderability and Anti-corrosion Properties of Zinc Vapour Deposited Steel Plate

| Thickness of Anti-rust Film ($\mu$m) | Solder Spreadability | | Anti-corrosion Properties | |
|---|---|---|---|---|
| | Initial Spreading Speed (mm$^2$/sec) | Equilibrium Spread Area (mm$^2$) | Wetting Test Results | Salt Water Spraying Test Results |
| 0 | 19 | 160 | 100% White Rust | Small Dotty Red Rust |
| 0.2 | 19 | 160 | 80–100% White Rust | 100% White Rust |
| 0.5 | 18 | 155 | 20–33% White Rust | 80–95% White Rust |
| 1.0 | 18 | 150 | 10–25% White Rust | 65–80% White Rust |
| 3.7 | 17 | 148 | 5–10% White Rust | 50–70% White Rust |
| 6.2 | 17 | 145 | 1–5% White Rust | 45–55% White Rust |
| 11.6 | 17 | 142 | 1–2% White Rust | 20–40% White Rust |
| 17.3 | 15 | 135 | Normal | 15–25% White Rust |
| 22.1 | 15 | 126 | Normal | 10–20% White Rust |

TABLE 4

Relation of Thickness of Alkyd Type Resin Anti-rust Film to Solderability and Anti-corrosion Properties of Molten Zinc Plated Steel Plate

| Thickness of Anti-rust Film ($\mu$m) | Solder Spreadability | | Anti-corrosion Properties | |
|---|---|---|---|---|
| | Initial Spreading Speed (mm$^2$/sec) | Equilibrium Spread Area (mm$^2$) | Wetting Test Results | Salt Water Spraying Test Results |
| 0.5 | 20 | 150 | 35–50% White Rust | 70–85% White Rust |
| 1.0 | 18 | 140 | 20–30% White Rust | 60–75% White Rust |
| 4.3 | 18 | 140 | 10–25% White Rust | 50–70% White Rust |
| 10.7 | 13 | 124 | 5–10% White Rust | 30–45% White Rust |
| 15.0 | 9 | 80 | 1–5% White Rust | 10–20% White Rust |
| 21.1 | 6 | 61 | Normal | 5–10% White Rust |

The testing methods were the same as in Example 1. In view of the conditions for suitable solderability and anti-corrosion properties as described in Example 1 as well as the above results, it was found that the thickness of alkyd type resin anti-rust film on molten zinc plated steel plate should preferably be 1.0–15 $\mu$m.

EXAMPLE 5

The same lot of commercially available galvanized steel plate as in Example 1 was spray-treated with the same commercially available alkali type etching agent as in Example 1 to remove substantially most of the oxides on the surface ($I_{Al^+}/I_{Zn^+} = 3$), and was then coated with commercially available petroleum type wax (trade name, "Non Ruster PSW-51" manufactured by Yushiro Chemical Industry Co., Ltd.) as an anti-rust film by means of a roll coater. The plate thus treated was dried at room temperature for 48 hours. The relation of the thickness of the dry anti-rust film to the solderability and anti-corrosion properties of molten zinc plated steel plate was investigated. The results are shown in Table 5.

TABLE 5

Relation of Thickness of Petroleum Type Wax Anti-rust Film to Solderability and Anti-corrosion Properties of Molten Zinc Plated Steel Plate.

| Thickness of Anti-rust Film ($\mu$m) | Solder Spreadability | | Anti-corrosion Properties | |
|---|---|---|---|---|
| | Initial Spreading Speed (mm$^2$/sec) | Equilibrium Spread Area (mm$^2$) | Wetting Test Results | Salt Water Spraying Test Results |
| 1.2 | 18 | 140 | 20–35% White Rust | 60–80% White Rust |
| 2.0 | 18 | 140 | 10–25% White Rust | 65–75% White Rust |
| 5.5 | 18 | 140 | 5–10% White Rust | 50–70% White Rust |
| 13.9 | 18 | 144 | Normal | Normal |

In view of the conditions for suitable solderability and anti-corrosion properties as described in Example 1 as well as the above results, it was found that the thickness of petroleum type wax anti-rust film should be at least 2.0 $\mu$m. On the other hand, if the thickness exceeds 20 $\mu$m, the plate becomes impractical for the same reasons as described in Example 1.

Consequently, in view of solder spreadability, anti-corrosion properties, uniform coatability and economy, the thickness of petroleum type wax anti-rust film should preferably be 2.0–20 $\mu$m.

EXAMPLE 6

Cans were prepared by means of an 18 liter can production line using general soldering techniques from the following plates: (a) a zinc plated steel ($I_{Al^+}/I_{Zn^+} = 3$) having an anti-rust film thickness of 1.1 $\mu$m prepared in accordance with this invention as in Example 1; (b) ordinary galvanized steel plate chromated in a chromium amount of about 20 mg/m$^2$, from which oxides on the surface were not removed for the purpose of comparison; and (c) commercially available tin electroplated steel plate having a thickness of 0.32 mm, the tin amount coated on one side being about 10 g/m$^2$.

Generally, in the production of tin plate cans, an interlocking seam joint is bonded by means of the dip soldering or wire soldering method or a combination of the two methods on a large scale.

For the purpose of checking the solderability required for the can material with regard to the above three samples (a), (b) and (c), the penetrability of solder into a interlocking seam joint was investigated in the following manner.

Two sheets of each of the above respective samples each having a size of 0.32 mm×60 mm were prepared for this test. An interlocking seam joint having a constant clearance was prepared by folding each end of the sample to a width of 5 mm and interlocking the folded ends by applying a load of 150 kg by means of a Amsler universal test machine. One side of the joint was then coated with a brush with a water soluble flux having the below composition, and the sample was placed on a solder bath maintained at 280° C.

| Composition of Flux | |
|---|---|
| ZnCl$_2$ | 18% by weight |
| NH$_4$Cl | 12% by weight |
| Nonionic surface active agent | 0.003% by weight |
| Higher alcohol | the rest |

Wire solder (diameter=2.0 mm, Sn 40% by weight—Pb 60% by weight) was then speedily and uniformly placed along the whole length of the joint, and was uniformly heated for about 20 seconds. The sample was then cooled and washed with water to remove the remaining flux. The solder penetrability of the respective samples was evaluated by observing the appearance and the sectional shape of the joint part.

Figure 1B:
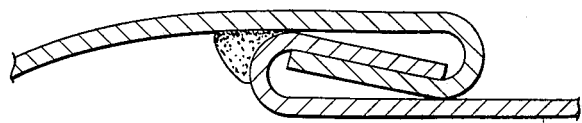
Figure 1C:
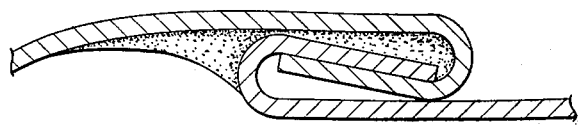

The results are shown in FIG. 1. Thus the appearance and the sectional shape of the interlocking seam joint of (a), the zinc plated steel plate of this invention having an excellent solderability, were substantially equivalent to those of (c), the ordinary tin plate, and consequently it was shown that (a), the zinc plated steel plate of this invention, has a satisfactory solder penetrability. On the other hand, as can be seen from FIG. 1, the solder penetrability of the joint of (b), ordinary galvanized steel plate, was very poor in comparison with the other two samples.

EXAMPLE 7

Some 18 liter can were produced under the below can production conditions from the above mentioned (a), zinc plated steel plate having a high solderability, from which oxides on the surface has been removed ($I_{Al}+/I_{Zn}+ = 5$), (b), ordinary galvanized steel plate, and (c), ordinary tine plate, by means of a commercial automatic can production line which is usually employed to produce 18 liter cans from tin plate using soldering techniques. Various performances of the cans thus produced were investigated.

Can Production Conditions (1) Blanking, bending and interlocking generation for the zinc plated steel plate were conducted in the same manner as for (c), ordinary tin plate.

(2) The interlocking seam joints of the top or bottom plate and the body plate were uniformly coated with a flux having the same composition as in Example 6 and a solvent type flux (trade name, "TF-30" manufactured by Tokyo Soldite Co., Ltd.; Composition: $ZnCl_2$ a major amount, $NH_4Cl$ = a minor amount, surface active agent = a minor amount, and nonionic water = the rest, this flux being diluted with ethylene glycol monobutyl ether) by means of a felt roller.

(3) Soldering was carried out in the following manner.

Top and bottom plates: bonded with wire solder (diameter = 2.0 mm, Sn 40% by weight—Pb 60% by weight) in the same manner as usual tin plate.

Body plate: bonded by dipping in a solder bath of 1 m length (Sn 40% by weight—Pb 60% by weight) maintained at 270°–275° C. for about 2 seconds.

(4) Can producing speed: 27 cans/minute.

Figure 2:
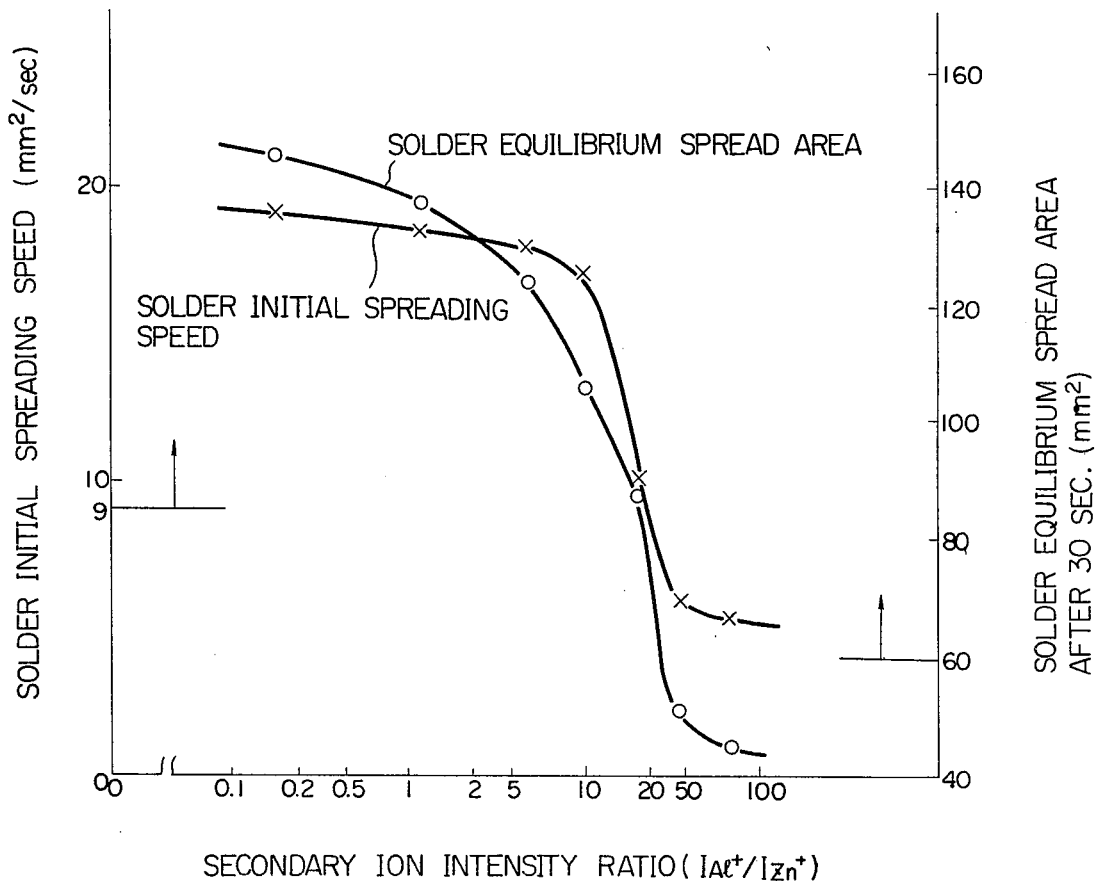
FIG. 2 is a cross-sectional view showing the state of penetration of solder into the respective interlocking seam joints of body plates of 18 liter-cans produced from: (2a) zinc-plated steel plate of this invention having an improved solderability, (2b) comparative ordinary galvanized steel plate and (2c) ordinary tin plate, in accordance with a commercial tin plate can production line as described in Example 7.
Figure 2A:
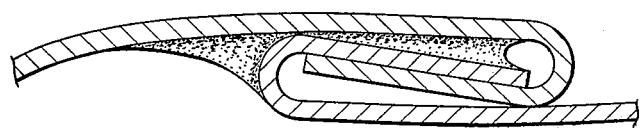
Figure 2B:
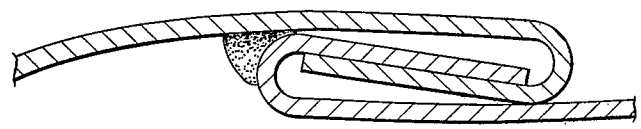
Figure 2C:
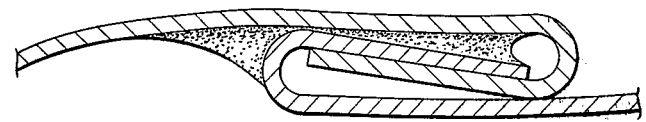

The sectional shapes of the interlocking seam joints of the sample cans thus produced are shown in FIG. 2. As can be seen from this figure, (a), the zinc plated steel plate of this invention, has a satisfactory solder, penetrability equivalent to that of (c), the ordinary tin plate of a comparative example. Thus, it was proved that the zinc plated steel plate of this invention provides no problems with regard to can production efficiencies including the solderability of the interlocking seam joint. On the other hand, the solder penetrability of the interlocking seam joint of (b) ordinary galvanized steel plate was very poor as in Example 6.

The above produced cans were also subjected to an air tightness test and a breaking strength test. The breaking test was conducted by propping a can filled with water. As can be seen from the results shown in Table 6, the can of this invention and the tin plate can were both satisfactory with regard to air tightness and breaking strength. On the other hand, the air tightness of the can produced from (b), the ordinary molten zinc plated steel plate, was very poor since the solder penetrability of the interlocking seam joint was insufficient as shown in FIG. 2. This is a fatal defect, and this can is useless as an 18 liter can.

TABLE 6

| | Performance of 18-Liter Can | | |
|---|---|---|---|
| | Can of this invention | Comparative can | Comparative can |
| Starting material | (a) Molten zinc plated steel plate having satisfactory solderability | (b) ordinary galvanized steel plate | (c) ordinary tin plate |
| Appearance of soldered part | satisfactory | not satisfactory (discontinuously soldered) | satisfactory |
| Airtightness[1] (Internally pressurizing test) | completely airtight up to a pressure of 1.5 kg/cm$^2$ | impossible to pressurize (not airtight) | completely airtight up to a pressure of 1.5 kg/cm$^2$ |
| Breaking strength[2] | no leaked water (sufficient strength) | — | no leaked water (sufficient strength) |

Note:

(1) Airtightness was tested by placing a sample can in water and pressurizing the inside of the can by a compressor to check the leakage of air.

(2) Breaking strength was tested by dropping a sample can filled with 18 liters of water from a 3 meter height above the ground to check the breakage state, thereby evaluating the bonding strength of the interlocking seam joint.

EXAMPLE 8

Some 18 liter cans were produced under the following can production conditions from the above mentioned (a), zinc plated steel plate having a high solderability of this invention, (b), ordinary galvanized steel plate, and (c), ordinary tin plate, by means of a commercial can production line which is usually employed to produce 18 liter cans from tin plate using wire solder to bond both a top or bottom plate and a body plate. Various performances of the cans thus produced were investigated.

Can Production Conditions (1) Blanking, bending and interlocking operating of the zinc plated steel plate were conducted under the same conditions as for (c), ordinary tin plate.

(2) The interlocking seam joints of the top or bottom plate and the body plate were bonded by means of the wire solder method using resin-containing wire solder (diameter = 2.0 mm, Sn 40% by weight—Pb 60% by weight).

(3) Can producing speed: 24 cans/minute.

The above produced cans were subjected to an air tightness test and a breaking strength test in the same manner as in Example 7. As a result of these tests, it was found that the can of this invention produced from (a), the zinc plated steel plate having a high solderability, had satisfactory air tightness and breaking strength (i.e. soldering strength) equivalent to those of the conventional comparative tin can produced from (c), the ordinary tin plate. On the other hand, the can produced from (b), the ordinary galvanized steel plate was not airtight, and it was impossible to pressurize the inside of the can. Thus, it was found that it is impossible to produce an 18 liter-can from (b), the ordinary molten zinc plated steel plate, using normal soldering techniques.

As mentioned above, the zinc plated steel plate of this invention has an excellent solderability, and a can produced from this zinc plated steel plate has satisfactory air tightness and soldering strength equivalent to those of conventional tin plate cans. The zinc plated steel plate of this invention having a high solderability is cheaper and more corrosion-resistant than conventional tin plate. Various cans such as a 18 liter-can, paint can and the like can be produced using the same equipment under the same production conditions and soldering conditions as used in the production of conventional tin plate cans. The can produced from the zinc plated steel plate of this invention has higher corrosion-resistance, and can be produced at a lower cost than conventional tin plate cans. Thus, the development of the zinc plated steel plate can of this invention comparable to the conventional tin plate cans leads to the saving of tin sources. Furthermore, the zinc plated steel plate can of this invention is more satisfactory in respect of cost, productivity, corrosion-resistance and the like than a tin free steel plate can produced by the use of seam welding or a special bonding agent. Thus, the zinc plated steel plate of this invention has a great commercial value.

What we claim is:
1. A zinc-plated steel plate having improved solderability prepared by plating a steel plate with zinc from a zinc bath containing at least 0.1% by wt of aluminum, removing the oxides from the surface of the thus-plated steel plate such that the surface, up to a depth of 200 Angstroms, is substantially free from oxides to such a degree that the ratio of the aluminum ion detection intensity $(I_{Al}+)$/zinc ion detection intensity $(I_{Zn}+)$ is not higher than 20 at the maximum as measured by a microanalyzer, and coating the thus-treated surface with an anti-rust film selected from the group consisting of an acryl type resin, petroleum type wax and an alkyd type resin to such an extent that the film has a thickness of 1.0–20 microns.
2. A zinc-plated steel plate according to claim 1, wherein said petroleum type wax anti-rust film has a thickness of 2.0–20 μm.
3. A zinc-plated steel plate according to claim 1, wherein said alkyd type resin anti-rust film has a thickness of 1.0–15 μm.
4. A zinc-plated steel plate according to claim 1, wherein said zinc plated steel plate is a galvanized steel plate, a zinc electroplated steel plate or a zinc vapour deposited steel plate.

* * * * *